United States Patent [19]

Sievenpiper

[11] 3,968,976
[45] July 13, 1976

[54] DUAL RATE LIQUID SUSPENSION STRUT
[75] Inventor: Ward Sievenpiper, Alden, N.Y.
[73] Assignee: A-T-O Inc., Willoughby, Ohio
[22] Filed: Jan. 10, 1975
[21] Appl. No.: 540,006

[52] U.S. Cl............................. 280/709; 267/64 A; 188/297
[51] Int. Cl.²........................................... B60G 11/28
[58] Field of Search .............. 280/124 F; 267/64 R, 267/64 A; 188/297, 303, 311, 322

[56] References Cited
UNITED STATES PATENTS

| 1,192,353 | 2/1916 | Stevens | 188/297 |
| 2,139,192 | 12/1938 | Krekel | 188/303 |
| 2,899,194 | 8/1959 | Zumwalt | 267/1 |
| 3,098,644 | 7/1963 | Phillips | 267/64 A |
| 3,163,262 | 12/1964 | Allinquant | 267/64 R |
| 3,193,875 | 7/1965 | Taylor | 267/64 A |
| 3,201,112 | 8/1965 | Wossner | 267/64 R |
| 3,578,303 | 5/1971 | Fullam | 267/64 R |
| 3,647,239 | 3/1972 | Katsumori | 280/124 F |
| 3,865,356 | 2/1975 | Wossner | 267/64 R |

Primary Examiner—M. H. Wood, Jr.
Assistant Examiner—John A. Carroll
Attorney, Agent, or Firm—Christel & Bean

[57] ABSTRACT

A hydraulic strut primarily for use in an off-highway vehicle suspension system having a pair of liquid springs connected together in tandem in axial alignment for providing two distinct spring constants to the suspension system. The spring constants are provided to operationally correspond to the loaded and unloaded condition of an off-highway vehicle such as large dump trucks and other similar equipment. Each liquid spring includes a cylinder filled with pressurized hydraulic fluid with a displacement rod reciprocably slidable in a sealed manner through one end of the cylinder means. The free ends of the two displacement rods are connected between the chassis and body portion of the vehicle to provide composite suspension afforded through the different spring constants. In addition, each liquid spring includes a dampening head attached to its respective displacement rod so as to provide spring suspension to the vehicle in a controlled and desired manner.

13 Claims, 5 Drawing Figures

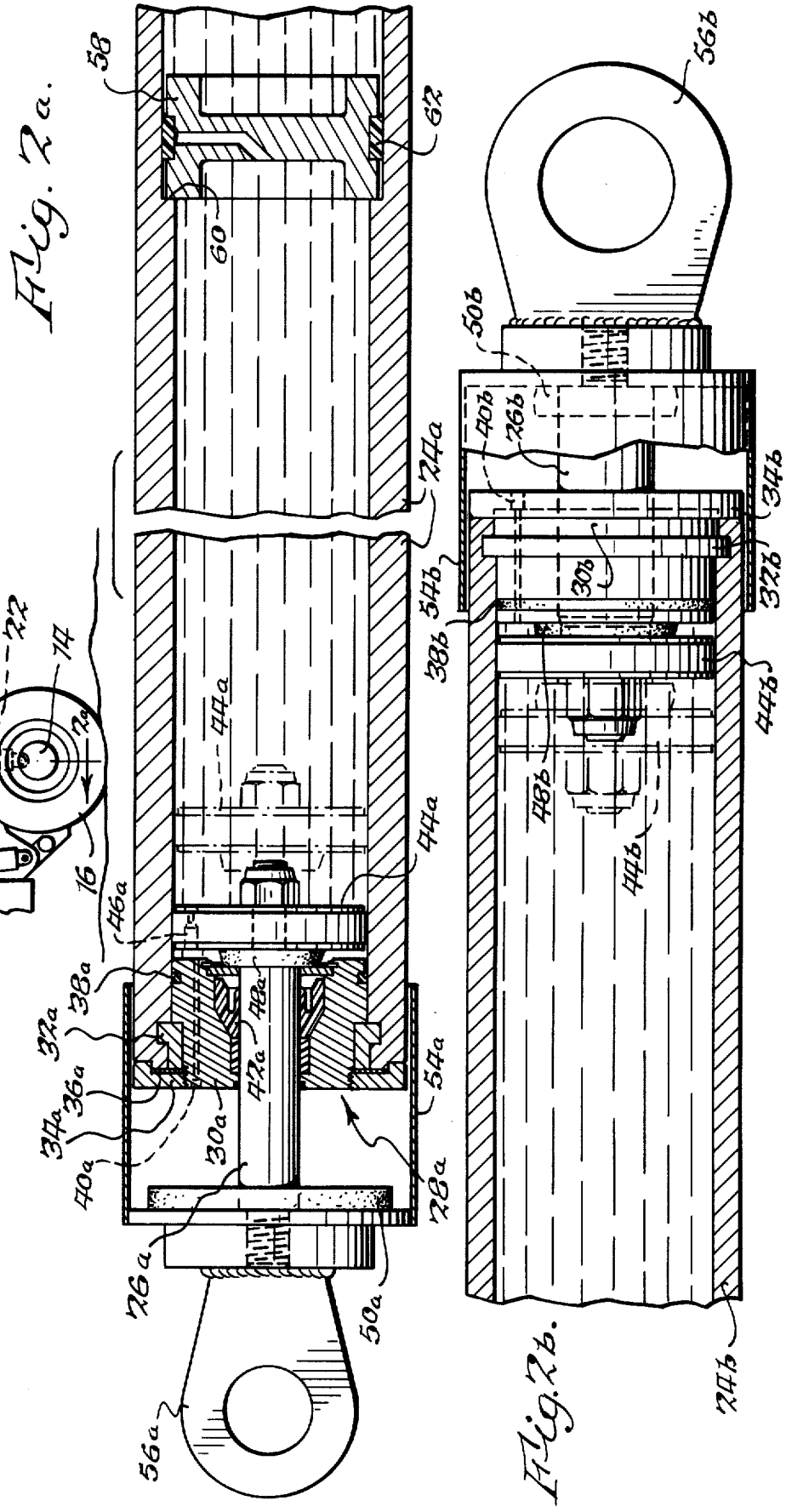

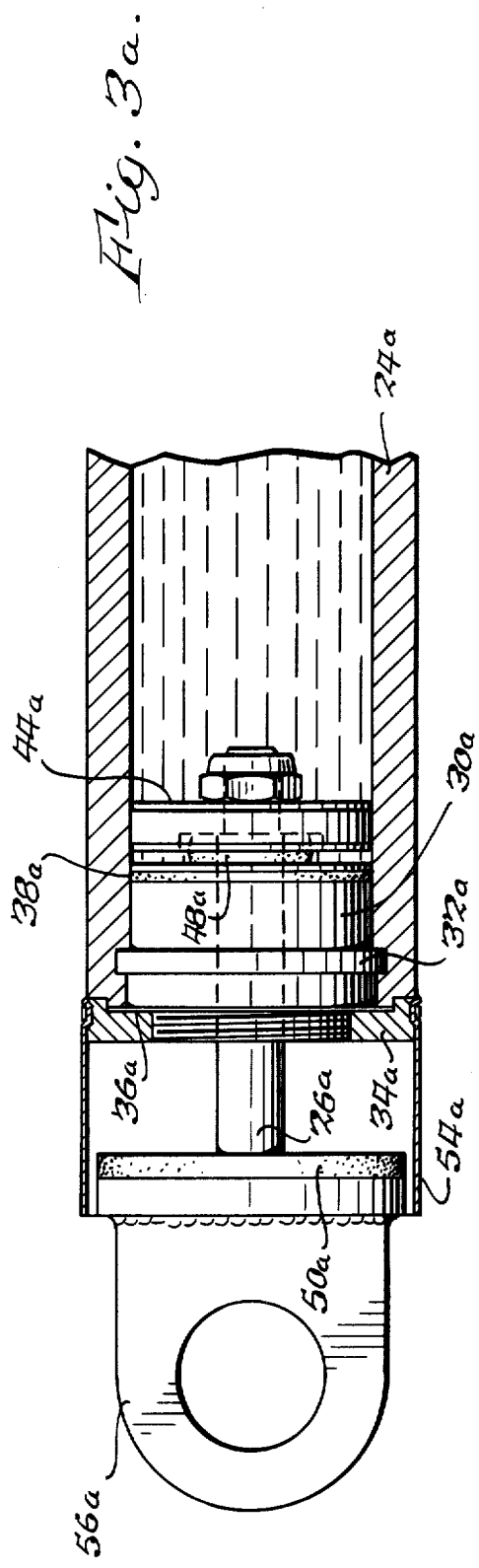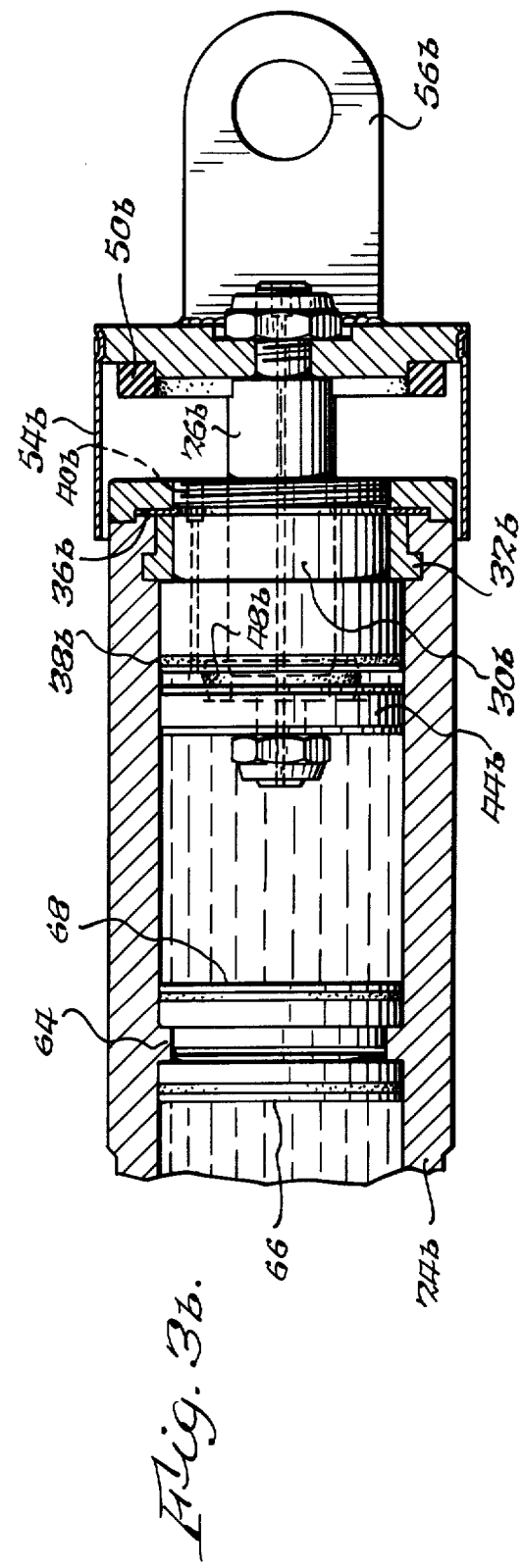

DUAL RATE LIQUID SUSPENSION STRUT

BACKGROUND OF THE INVENTION

The present invention relates generally to a compressible fluid suspension unit. More specifically, the present invention relates to a suspension strut for assembly in a vehicle suspension system wherein such suspension system is subjected to large weight differentials resulting from loaded and unloaded conditions of the vehicle.

To improve riding qualities of any motor vehicle, it is desirable to provide suspension springs that have a low spring rate. These low spring rates result in soft springs which cushion the vehicle ride but which have the disadvantage of causing excessive and objectionable deflection of a vehicle body when it is loaded in an extreme manner.

Because of the massive loads carried by off-highway vehicles such as large earth moving dump trucks and the like to which the present invention is applicable, the weight differential between the loaded and unloaded conditions varies greatly. Consequently, a suspension designed to ride well in the loaded condition would be unduly stiff when riding empty. Conversely, a suspension designed to ride well in the unloaded condition will be unduly soft when riding in the loaded condition which in turn results in well recognized safety and operational problems with respect to the vehicle.

The problem therefore in providing a suspension system that will accommodate the off-highway vehicle in the loaded condition is that of having the vehicle subjected to an unduly stiff suspension and ride during unloaded use. This results in a hard ride which is obviously uncomfortable to the driver and passengers in view of the inability of the suspension system to absorb road shock which in turn results in excessive stress being transmitted throughout the entire vehicle structure. This condition has obvious deleterious affects on the vehicle body and tires, the latter being subjected to excessive sidewall flexing, bruising and heat buildup which in turn decreases their useful life. The above situation indicates the need for a suspension system that provides similar ride characteristics in an off-highway vehicle at both ends of its load scale, that is in a loaded and unloaded condition. Such characteristics are provided by the double liquid spring arrangement to be described in which two separate spring constants are provided for accommodating the various loading conditions of an off-highway vehicle.

The prior art includes various types of suspension springs such as leaf spring, rubber, pneumatic and single rate or single stage liquid springs. However, none of the prior art structures have been able to provide a spring which will accommodate the requirements of an off-highway vehicle operation contemplated by the present invention in which a large weight differential is encountered through loaded and unloaded conditions. Correspondingly, it is necessary that a spring or suspension system having such a capability be of reasonable size so as to be copacetic within the general confines of a vehicle structure, none of which has been effectively accomplished in the prior art structures.

SUMMARY OF THE INVENTION

Accordingly, one object of the present invention is to provide a suspension system that will provide similar ride characteristics to a vehicle and particularly an off-highway vehicle at both ends of a loaded and unloaded operational scale.

Another object of the present invention is to provide a suspension system of an off-highway vehicle which will provide improved stability thereto resulting in a smoother ride in both a loaded and unloaded condition which improves driver comfort and control and necessarily the safety factor attendant thereto.

A further object of the present invention is to provide a suspension system that is simple in design and has a minimum number of moving parts resulting in long service life and low maintenance costs.

Still another object of the present invention is to provide the aforesaid suspension system which can be designed to fit current vehicle requirements.

A still further object of the present invention is to provide the aforesaid suspension system which minimizes dynamic loads being transmitted to the vehicle structure which in turn lowers the induced stresses in such vehicle.

In summary, the present invention generally provides two liquid springs connected together in axial alignment and which respectively have different spring constants to accommodate an off-highway vehicle in either a loaded or unloaded condition. More specifically, each liquid spring includes a cylinder precharged with a hydraulic fluid such as of the silicon variety and which includes a displacement rod slidably mounted in the cylinder end nonadjacent to the other cylinder. The two liquid springs have different spring constants by means of varying the displacement rod diameters with respect to the cylinder volumes. Each spring absorbs loading through travel of its respective displacement rod into its cylinder cavity so as to further compress the hydraulic fluid contained therein. With the free ends of the displacement rods of the two springs assembled between the chassis and body portions of an off-highway vehicle, the aforesaid spring constants of the two liquid springs operationally accommodate the vehicle in a loaded and unloaded condition.

The foregoing and other objects, advantages, and characterizing features of the present invention will become clearly apparent from the ensuing detailed description of an illustrative embodiment thereof, taken together with the accompanying drawings wherein like reference characters denote like parts through the various views.

BRIEF DESCRIPTION OF THE DRAWINGS

FIG. 1 is a fragmentary side view in plan of an off-highway vehicle wheel assembly showing the suspension strut of the present invention in an assembled disposition;

FIG. 2a is a fragmentary, longitudinal view in section of one of two similar liquid springs connected together with a floating piston disposed therebetween taken along line 2a—2b of FIG. 1;

FIG. 2b is a fragmentary, longitudinal view in section of a second liquid spring which is connected to the liquid spring shown in FIG. 2a;

FIG. 3a is a fragmentary, longitudinal view in section of a liquid spring adapted for connection to a second liquid spring; and FIG. 3b is a fragmentary, longitudinal view in section of a liquid spring to be connected to the liquid spring shown in FIG. 3a and to be separated therefrom by a fixed barrier interface.

DETAILED DESCRIPTION OF THE PREFERRED EMBODIMENT

Heretofore, springs generally known as liquid and compressible solid springs, have been suggested for various applications where mechanical springs, such as, coil or leaf springs, have been used and in applications where mechanical springs could not be used because of their physical limitations. In a liquid or solid spring, a relatively lightweight displacement rod is accelerated when the spring is actuated, to compress the hydraulic fluid contained within a cylinder means, whereas in a mechanical spring the entire mass of the spring is moved to some degree is each cycle so that the natural frequency of a liquid or solid spring is much higher than a coil spring, enabling it to be operated at much higher velocities. A liquid or solid spring is much more compact and much smaller than a mechanical spring which will carry the equivalent load. Conversely, a liquid or solid spring of a given size will carry many times the load of the same size mechanical spring.

Liquid of solid springs ahve been used between two relatively movable parts, the container or cylinder means being connected to one of these parts and the displacement rod being slidable within such cylinder means being connected to the other movable part. When a force or load is applied to one of the two relatively movable parts, the displacement rod is forced inwardly of the cylinder means, compressing the medium therein. When the force of the load is relieved, the liquid expands returning the displacement rod and the part, to which it is connected, to the initial position.

As can be appreciated from the above, a liquid spring is highly desirable in suspension applications wherein high levels of loading is experienced in the suspension system which in turn must be assembled within a limited space. However, a single liquid spring having a fixed spring constant cannot satisfy all of the demands placed on a suspension system in a vehicle such as one of the off-highway variety in which a wide range of loading conditions is experienced by the suspension system.

Referring now in detail to the illustrative embodiments depicted in the accompanying drawings, there is shown in FIG. 1 an exemplary application of the composite strut forming the present invention. As shown therein, an off-highway vehicle shown in fragmentation and generally indicated at 10 has a body portion 12 supported on an independent axle 14 and tire 16. An off-highway vehicle such as a large dump truck having a load carrying body 12 is pivoted at 18 and is urged to pivot thereabout by a hydraulic cylinder means 20. The present invention is concerned with the suspension strut 22 disposed between the vehicle body and independent axle 14. As fully discussed hereinabove, the suspension strut is provided to absorb the transmission of shock between axle 14 and body 12. As further discussed hereinabove, however, such shock absorption and cushioning of the vehicle is dependent upon the spring constant of strut 22 and the loaded condition of vehicle 10. It is to further to be understood that the placement of strut 22 is by way of example and that other similar struts would be correspondingly placed at other suspension points in vehicle 10.

Referring now to the strut shown in FIG. 2a, a first cylinder means 24a is axially aligned and integrally connected to the cylinder means 24b shown in FIG. 2b. Each of the cylinder means and its respectively associated structure is similar and for purposes of description will be indicated by similar numerical designations and different letter suffixes corresponding to the cylinder structure shown in FIG. 2a and that shown in FIG. 2b.

As shown in FIG. 2a, cylinder 24a includes a displacement rod means 26a having an end portion concentrically disposed within the end of cylinder 24a which is nonadjacent to cylinder 24b. Displacement rod 26a is reciprocably slidable in a sealed manner through such end portion of cylinder 24a to compressibly displace hydraulic fluid contained therein. The cylinder 24a further includes an end portion generally shown as 28a which includes a housing member 30a concentrically disposed within the end of the cylinder. Such housing member is held in sealed engagement with respect to the cylinder by means of a shear ring 32a and associated cap and sealing gasket 34a and 36a, respectively. Housing member 30a is further sealed with respect to the cylinder by means of an O-ring 38a placed in an annular groove in the housing member adjacent to the inner surface of the cylinder. A filler valve 40a and associated passages is provided in housing member 30a for purposes of precharging the cavity of cylinder 24a with a compressible hydraulic fluid. In addition, the displacement rod 26a is slidable within the housing 30a and is sealed with respect thereto by means of the packing gland arrangement generally indicated as 42a which is known in the prior art. The packing gland assembly 42a serves to maintain hydraulic pressure within the cylinder cavity while allowing sliding movement between displacement rod 26a and housing 30a without leakage therebetween resulting.

A dampening head means 44a is affixed to the inner end portion of displacement rod 26a for generation of dampening forces during telescopic movement of the displacement rod 26a relative to the cylinder 24a. The dampening head 44a further includes metering orifices 46a to provide controlled passage of hydraulic fluid through the dampening head during movement thereof with the displacement rod through the cylinder. As further shown in FIG. 2a, the outer or left side of the dampening head includes a bumper pad 48a which is similar in construction and function to the bumper pad 50a. Both bumper pads are made of elastomeric material and serve to cushion the displacement rod at respective ends of its stroke or travel. As shown in FIG. 2a, the displacement rod is at its outermost position with the bumper pad 48a in abutment with a ring means 52a disposed in the housing member. Similarly, as shown in dotted lines, the displacement rod and dampening head may travel inwardly whereby bumper pad 50a would come into abutment with the outer end surface of housing member 30a. A duct shield 54a is provided to concentrically ride over the outer wall of cylinder 24a so as to shield the displacement rod 26a and the end portion of the cylinder structure from dirt and other foreign matter. An assembly joint 56a is provided at the free end of the displacement rod 26a which together with the assembly joint 56b on displacement rod 26b provides for connection of the combined liquid springs shown in FIGS. 2a and 2b between the chassis and body of an off-highway vehicle all of which is generally shown in FIG. 1.

As previously stated, the cylinder 24b is connected integrally in alignment with cylinder 24a and the displacement rod and associated structure in cylinder 24b is similar to that described in FIG. 2a. As further shown in FIG. 2a, the adjacent ends of te cylinders are open with respect to one another and include a floating piston means 58 slidable in a reciprocable manner therebetween. The abutment means or shoulder 60 limits travel of the piston into cylinder 24a as to be more fully described. The floating piston 58 further includes sealing ring means 62 for providing a sliding sealed relationship between the floating piston 58 and the inner walls of the adjacent end portions of cylinders 24a and 24b. In this manner, the piston may float in a limited axial range between the open adjacent end portions of the cylinders to effectively vary the internal volume thereof. Such floating piston movements is dictated by the relative hydraulic pressure differential in the two cylinders which will also be more fully described hereinbelow.

The two liquid springs separately shown in FIGS. 3a and 3b are substantially identical to the liquid springs described in FIGS. 2a and 2b with the exception that the springs in FIGS. 3a and 3b have cylinder cavities separated from one another through closed adjacent portions therein. More specifically, as shown in FIG. 3b, a shoulder means 64 protrudes inwardly at the junction point of the two cylinder walls. A fixed barrier interface is provided between the two cylinder cavities by means of the adjacent cylinder end portions 66 and 68 being held in abutment against opposite sides of the shoulder 64 by the hydraulic pressure in their respective cylinder cavities. As stated, the remainder of the combined liquid spring structure shown in FIG. 3a and 3b is susbstantially identical to that of FIGS. 2a and 2b.

In describing the operation of the present invention, reference will be made to the FIG. 2 strut and the FIG. 3 strut. Utilizing such a reference indication, it is to be understood that the FIG. 2 strut represents the aligned connection of the spearate liquid springs shown in FIGS. 2a and 2b with the floating piston 58 disposed in a sliding manner therebetween through the respective open adjacent ends of the cylinder cavities. Similarly, it is to be understood that the FIG. 3 strut comprises the aligned connection of the liquid springs shown in FIGS. 3a and 3b with a fixed barrier interface provided between the respective cylinder cavities thereof by the closed adjacent end portions 66 and 68 shown in FIG. 3b.

In regard to the hydraulic concept in both the FIG. 2 and FIG. 3 struts, it is to be understood that the spring constant of a liquid spring is determined by comparing the total internal volume of the spring cylinder to the volumetric displacement per unit of axial length of a displacement rod slidable therein. In other words, as shown in detail in FIG. 2a, the hydraulic fluid contained in cylinder 24a under an initial pressure with the displacement rod in the outward disposition shown therein, will become further compressed as the displacement rod 26a is urged into the cylinder cavity as shown in dotted lines. Such compression of the hydraulic fluid is caused by the additional volume or space occupied by the rod 26a within the cylinder cavity. In this manner, each unit of axial length of the displacement rod 26a displaces and compresses a corresponding amount of hydraulic fluid with respect to the total volume of the cylinder under initial conditions.

Therefore, in developing two different spring constants for the two liquid springs in a single strut member, it is proposed to vary the volume of each spring cylinder and the diameter of each displacement rod associated therewith so as to vary the spring constant described hereinabove. In varying the diameter of the displacement rod the volumetric displacement of such rod per unit of axial length thereof is obviously varied while the volume of the spring cylinders may be varied through variation of their diameter as well as their axial length. As shown in the FIG. 2 strut, each cylinder 24a and 24b has the same diameter while having different axial lengths in addition to the displacement rods 26a and 26b having different diameters in order to arrive at the desired spring constant for each spring. It is understood however that the diameters of the respective spring cylinders could be different with respect to one another.

In considering the operation of the FIG. 3 strut, reference will be made to the FIG. 2a detail since it is identical to the FIG. 3 strut with the exception of the floating piston 58. The cylinders in the FIG. 3 strut are precharged with a hydraulic fluid such as silicon by use of the filler valve and passage 48. Such precharging is desirable in order to place at least a minimum loading on the packing gland assembly 42a and the closed cylinder end portions 66 and 68.

The compressibility of the silicon with the rate of volume change due to rod displacement gives the suspension a smooth operation. Such a hydraulic fluid is also desirable from the point of view of temperature stability. For example, a 200°F. temperature change only results in a 50 p.s.i. pressure change in a silicon fluid. The preformance of the suspension unit is therefore not adversely affected by temperature changes. Moreover, tests conducted with respect to the present apparatus over the most demanding work cycles indicate a temperature rise within the unit of only 20°F. approximately.

If the cylinders of the springs shown in FIGS. 3a and 3b were identical with respect to their diameters and axial lengths, then the FIG. 3a spring would have a higher spring constant than the FIG. 3b spring due to the smaller diameter displacement rod in FIG. 3a as the term "spring constant" has been defined hereinabove. The amount of force necessary to urge the displacement rod in FIG. 3a inwardly a unit of axial length is inversely proportional to the spring constant as such term has been defined in this specification. In other words, the FIG. 3a spring has a relatively high ratio of cylinder volume to volumetric rod displacement per unit length of displacement rod when compared to such corresponding ratio in FIG. 3b. Therefore, the spring constant in FIG. 3b would be smaller than that in FIG. 3a while a smaller amount of force is required to urge the displacement rod in FIG. 3b inwardly.

Therefore, in an assembled position, the spring in FIG. 3a of strut 3 will become operational before the spring in FIG. 3b since the FIG. 3a spring reacts to a lesser amount of shock and resulting force. Conceptually, the FIG. 3a spring therefore would be generally operational during the unloaded condition of the vehicle. Prior to such operation, hydraulic fluid initially is in equilibrium on both sides of the dampening head or plate means indicated as 44a in FIG. 2a. Such dampening head or plate is loosely fit with respect to the cylinder inside wall so that upon axial movement of the displacement rod there will not be frictional interference between the dampening head and the cylinder. In addition, the metering orifices 46a and the clearance between the dampening head and the cylinder wall provide controlled passage of hydraulic fluid past the dampening head during movement of the displacement rod in the cylinder which in turn creates increased hydraulic pressure therein and the tendency of the hydraulic fluid to flow past the dampening head to reach a state of equilibrium within the cylinder cavity. It can therefore be appreciated that the dampening head in the form of a plate means with orifices 46a as illustrated provides controlled shock absorption to the spring movement of the displacement rod and the operational characteristics of the dampening head can be controlled by the placement and design of such orifices therein and the clearance provided with respect to the cylinder sidewall.

With respect to the FIG. 3, strut, the FIG. 3a spring will continue to compress upon loading of the vehicle until the hydraulic pressure in the cylinder of FIG. 3a is substantially more than the pressure in the cylinder of the spring in FIG. 3b. At this point, even though the spring in FIG. 3b has a relatively lower spring constant and therefore requires relatively more force to engage its displacement rod, such displacement rod will be displacing fluid in its cylinder cavity at a lower pressure than that existing in the FIG. 3a cavity with the displacement rod in FIG. 3a substantially engaged. As can be seen from the fixed nature of the closed end portions 66 and 68 of the strut 3 springs, fluid pressure in the respective springs exist independent of one another. It is further to be noted that in operation of the FIG. 3 strut, that a smooth transition takes place between the operation of the FIG. 3a spring and the FIG. 3b spring due to the operation of the FIG. 3b spring being initiated before the FIG. 3a spring has bottomed out. Such a smooth transition may avoid any spike in the ride characteristics of the vehicle in any loading situation. It is anticipated that both cylinder cavities in the strut 3 will be precharged to an equal amount. However, it is within the scope of the present invention that there could be different initial prechargings in the cylinder cavities of strut 3 which could be employed to vary the operational transition and characteristics between the two liquid springs therein all of which can be specifically designed for a particular vehicle application.

A slightly different operation takes place in strut 2 as compared to strut 3 in view of the floating piston 58 as compared to the closed cylinder end portions 66 and 68 in strut 3. In strut 2, the liquid spring having the smaller diameter displacement rod 26a has a higher spring constant than that corresponding to displacement rod 26b. However, due to the floating piston 58 hydraulic pressure buildup in cylinder cavity 24a has an affect on the hydraulic pressure in the cavity of cylinder 24b. Assuming that both cavities of cylinders 24a and 24b are precharged to the same degree, for example in the neighborhood of 1000 psi, the smaller diameter displacement rod 26a will function and move inwardly first with a lightly loaded or empty vehicle. The displacement rod 26a enters the cavity of cylinder 24a and the pressure therein will ultimately rise urging the floating piston 58 to the right into te cavity of cylinder 24b causing a commensurate hydraulic pressure increase therein. As displacement rod 26a starts to bottom out, displacement rod 26b will assume further loading as it enters the cavity of cylinder 24b causing additional pressure increase therein and consequently urging the floating piston 58 back into the cavity of cylinder 24a to thereby cause a soft transition between the two liquid springs shown in FIGS. 2a and 2b. However, when the floating piston reaches the shoulder or abutment means 60a, the cavity in cylinder 24b becomes the sole support for providing the desired suspension to a loaded vehicle. As can be appreciated by one skilled in the art the exact placement of the floating piston 58 in the cylinders 24a and 24b can be varied so as to provide suspension characteristics adapt able to any particular vehicle. In addition, it is within the scope of this invention that different initial charging pressures could be provided to the cavities of cylinders 24a and 24b in strut 2 wich could result in the initial condition of floating piston 58 being in affirmative engagement with abutment means 60a.

From the foregoing, it is apparent that the objects of the present invention have been fully accomplished. As a result of this invention a suspension system is provided which imparts similar ride characteristics to an off-highway vehicle in both a loaded and unloaded condition. As a result thereof, improved stability and a smoother ride in such a vehicle is encountered which necessarily improves driver comfort and control of the vehicle. Moreover, the suspension system described hereinabove as constituting the present invention has a minimum number of moving parts which are only the displacement rods and in the FIG. 2 strut, the floating piston 58. Such a mimimum number of moving parts results in long service life and low maintenance costs. As is to be appreciated from the flexibility in varying the displacement rod diameters, cylinder diameters, cylinder lengths, and cylinder pre-charging pressure, the suspension system envisioned in the present invention can be designed to fit specific requirements of a particular vehicle. A primary benefit of the present invention, however, resides in the fact that the present suspension system minimizes the dynamic loads being transmitted to the vehicle in all operational conditions.

I claim:

1. A composite suspension strut adapted for connection to vehicles experiencing a side range of loading conditions, said composite suspension strut comprising:
   first and second cylinder means, each of said first and second cylinder means having a compressible hydraulic fluid sealed therein and said cylinder means being axially aligned one to another,
   first and second displacement rod means, said first and second displacement rod means having end portions concentrically disposed within the non-adjacent ends of said first and second cylinder means respectively and being reciprocably slidable in a sealed manner through said non-adjacent ends to compressibly displace said hydraulic fluid therein and the ratio of the total internal volume of said first cylinder means to the volumetric displacement per unit of axial length of said first displacement rod means being different from each corresponding ratio of said second cylinder and second displacement rod means so that the combination of said first displacement rod and first cylinder means forms a first liquid spring having a first spring constant and the combination of said second displacement rod means and second cylinder means forms a second liquid spring having a second spring constant, the latter spring constant being different from said first spring constant.

2. A composite suspension strut as set forth in claim 1 wherein said first and second cylinder means are integrally connected to one another and have closed adjacent end portions separating the cavity of said first cylinder means from communication with the cavity of said second cylinder means.

3. A composite suspension strut as set forth in claim 1 wherein said first and second cylinder means are integrally connected to one another and have open adjacent end portions providing communication therebetween and said strut further includes a piston means disposed in said open adjacent end portions and being reciprocably slidable therein.

4. A composite suspension strut as set forth in claim 3 further including piston abutment means so that said piston floats in a limited axial range between said open adjacent end portions.

5. A composite suspension strut as set forth in claim 4 wherein said piston abutment means comprises a shoulder disposed on the internal surface of one of said cylinder means.

6. A composite suspension strut as set forth in claim 2 further including first and second dampening head means within said first and second cylinder means respectively for generation of dampening forces during telescopic movement of each said displacement rod end portion relative to each respectively associated cylinder means.

7. A composite suspension strut as set forth in claim 6 wherein each said dampening head means comprises a plate means disposed within said cylinder means for sliding movement with respect to the inner sidewall of said cylinder, said plate means being connected to said displacement rod means associated with said cylinder means for movement therewith and said plate means including metering orifices to provide controlled passage of hydraulic fluid through said plate means during telescopic movement of each said displacement rod means relative to its respectively associated cylinder means.

8. A composite suspension strut as set forth in claim 3 further including first and second dampening head means within said first and second cylinder means respectively for generation of dampening forces during telescopic movement of each said displacement rod means relative to its respectively associated cylinder means.

9. A composite suspension strut as set forth in claim 8 wherein each said dampening head means comprises a plate means disposed within said cylinder means for sliding movement with respect to the inner sidewall of said cylinder, said plate means being connected to said displacement rod means associated with said cylinder means for movement therewith and said plate means including metering orifices to provide controlled passage of hydraulic fluid through said plate means during telescopic movement of each said displacement rod means relative to its respectively associated cylinder means.

10. A composite suspension strut as set forth in claim 7 wherein said first and second cylinder means have substantially equal inside diameters and unequal axial lengths and said displacement rod means respectively associated therewith have unequal diameters with respect to one another whereby the axial lengths of said cylinder means and the diameters of said displacement rod means associated therewith may be varied to correspondingly vary the spring constants of said liquid springs with respect to one another.

11. A composite suspension strut as set forth in claim 9 wherein said first and second cylinder means have substantially equal inside diameters and unequal axial lengths and said displacement rod means respectively associated therewith have unequal diameters with respect to one another whereby the axial lengths of said cylinder means and the diameters of said displacement rod means associated therewith may be varied to correspondingly vary the spring constants of said liquid springs with respect to one another.

12. A composite suspension strut in combination with a vehicle experiencing a wide range of loading conditions and having a chassis and body portion, said composite strut comprising:

first and second cylinder means, each of said first and second cylinder means having a compressible hydraulic fluid sealed therein and both of said cylinder means being integrally connected one to another in axial alignment and having closed adjacent end portions separating the cavity of said first cylinder means from communication with the cavity of said second cylinder means, first and second displacement rod means, said first and second displacement rod means having end portions concentrically disposed within the non-adjacent ends of said first and second cylinder means respectively and being reciprocably slidable in a sealed manner through said non-adjacent ends to compressibly displace said hydraulic fluid therein and the ratio of the total internal volume of said first cylinder means to the volumetric displacement per unit of axial length of said first displacement rod means being different from such corresponding ratio of said second cylinder means fnd said second displacement rod means so that the combination of said first displacement rod means and first cylinder means forms a first liquid spring having a first spring constant and the combination of said second displacement rod means and second cylinder means forms a second liquid spring having a second spring constant, the latter spring constant being different from said first spring constant, and first and second dampening head means, said first and second dampening head means being disposed within said first and second cylinder means respectively for generation of dampening forces during telescopic movement of each said displacement rod means relative to its respectively associated cylinder means, and the ends of said first and second displacement rod means not disposed within said cylinder means associated therewith being connected between said chassis and said body of said vehicle so that dampened suspension is provided with respect to said chassis and said body of said vehicle.

13. A composite suspension strut in combination with a vehicle experiencing a wide range of loading conditons and having a chassis and body portion, said composite strut comprising:

first and second cylinder means, each of said first and second cylinder means having a compressible hydraulic fluid sealed therein and both of said cylinder means being integrally connected to one another in axial alignment and having open adjacent end portions providing communication therebetween, a piston means, said piston means being disposed in said open, adjacent end portions and being reciprocably slidable therein, first and second displacement rod means, said first and second displacement rod means having end portions concentrically disposed within the non-adjacent ends of said first and second cylinder means respectively and being reciprocably slidable in a sealed manner through said non-adjacent ends to compressibly displace said hydraulic fluid therein and the ratio of the total internal volume of said first cylinder means to the volumetric displacement per unit of axial length of said first displacement rod means being different from such corresponding ratio of said second cylinder means and said second displacement rod means so that the combination of said first displacement rod means and first cylinder means forms a first liquid spring having a first spring constant and the combination of said second displacement rod means and second cylinder means forms a second liquid spring having a second spring constant, the latter spring constant being different from said first spring constant, and first and second dampening head means, said first and second dampening head means being disposed within said first and second cylinder means respectively for generation of dampening forces during telescopic movement of each said displacement rod means relative to its respectively associated cylinder means, and the ends of said first and second displacement rod means not disposed within said first and second cylinder means associated therewith being connected between said chassis and said body of said vehicle to provide dampened suspension with respect to said body and said chassis.

* * * * *